Aug. 5, 1941.      W. BUSCHBECK ET AL      2,251,540
CORONAPROOF CONDENSER PLATE
Filed Feb. 24, 1939

INVENTORS
WERNER BUSCHBECK
WILHELM KUMMERER
BY
ATTORNEY

Patented Aug. 5, 1941

2,251,540

UNITED STATES PATENT OFFICE 2,251,540

CORONAPROOF CONDENSER PLATE

Werner Buschbeck and Wilhelm Kummerer, Berlin, Germany, assignors to Telefunken Gesellschaft für Drahtlose Telegraphie m. b. H., Berlin, Germany, a corporation of Germany Application February 24, 1939, Serial No. 258,153
In Germany February 25, 1938

2 Claims. (Cl. 175—41)

The tendency in recent times is to produce condensers from especially prepared ceramic materials, more especially it is desired to produce such materials to have very high dielectric constants (up to $\epsilon=120$). This is usually accomplished by employing a mixture containing rutile. In condensers made of ceramic material the operating potential is limited generally in view of the corona phenomena at the border of the metal layer. Since the prepared material has a high electric breakdown strength and can in the case of larger plates not be made as thin as desired, the application of high potentials would, however, be very desirable so as to accommodate high wattless powers while employing a small amount of material. In order to avoid the corona effect various forms of the border have been proposed and which reside generally in that the metal layers are drawn apart at the ends and possibly bent over to such an extent that the border of the layer lies opposite a surface having the same potential. This construction of the plates which requires a considerable increase in thickness of the border causes considerable difficulty in the manufacture and owing to the heat stresses this construction entails in flat condenser plates at burning the ready appearance of very thin cracks in the plate which lead to electric breakdowns. Furthermore, the cooling of condensers comprising stacked plates of such a structure is considerably hindered by such a protective border against corona effects since pockets are formed preventing a free flow of the cooling liquid.

The invention relates to plates without such a corona protecting border or plates having only a slight increase in the thickness of the border for diminishing the danger of corona effects. According to the invention, all borders of the layers are glazed or covered with a bulgy border formed of a glass-like mass, such as for example sodium aluminum silicate, known in the porcelain art as a glass or fire-proof enamel. This bulgy border preferably has the thickness of a few tenths of a millimeter and the enamel is so composed that very fine cracks cannot appear therein in the case of temperature changes and slight mechanical deformations; furthermore, care is taken to obtain a possibly high dielectric constant.

Figure 1:
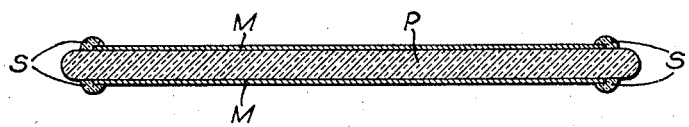
Figure 2:
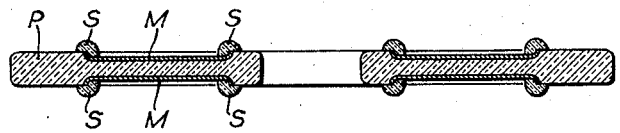
Figure 3:
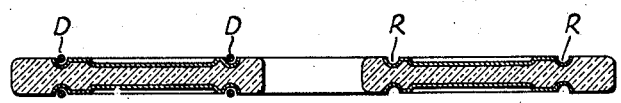

The Figs. 1, 2 and 3 show condenser plates in cross-section and having glazed borders in accordance with the invention. Fig. 1 shows a completely level plate P with the two layers M protected at the borders against corona effects by means of the bulgy glass parts S. Fig. 2 shows an annular plate P such as employed primarily in condensers in which oil circulates. The layers M lie in this case in ring-like grooves and the borders of the layers extend as can be seen at right angle to the plane of the plate. If in a condenser having a great number of such plates in stacked arrangement, always two layers having the same potential are situated opposite one another, it can be readily seen that in this way the danger of corona effects is already greatly diminished. In addition, the borders of a plate according to the invention are covered with bulgy glass parts in order safely to avoid the danger of corona effects.

Such protective bulges are of particular importance for plates consisting of a material having a high dielectric constant, such as, for instance, of materials containing rutile with a dielectric constant up to $\epsilon=120$, and these bulges are particularly appropriate if the plates are not used in oil.

It will be advisable to provide such plates with a border shape that is as safe as possible against corona effects. A mode of construction for this purpose and which does not cause difficulties in the making of the ceramic parts is shown in Fig. 3. The thicker part of the plate has cut therein semi-circular grooves R which are directly above one another or somewhat displaced to each other and which are likewise metallized. In order further to improve the field formation a round wire D or an insulating mass having a high dielectric constant (eventually enamel) may be placed in these grooves.

What is claimed is:

1. A condenser element comprising a plate of insulation material having a high dielectric constant, a central aperture in said plate, a ring-like groove on each surface of said plate and surrounding said aperture, a narrow groove on each side of said ring-like groove, a metallic layer on each surface and in the zone of said ring-like grooves, the borders of said metallic layers arranged to extend to the surface of said plate and to cover the surface of said narrow grooves, and a protuberant border of insulation material covering the edges of said metallic layers to prevent corona effects on said element.

2. A condenser element comprising a plate of insulation material having a high dielectric constant, a central aperture in said plate, a ring-like groove on each surface of said plate and surrounding said aperture, a narrow semi-circular groove on each side of said ring-like groove, a metallic layer on each surface and in the zone of said ring-like grooves, the borders of said metallic layers arranged to extend to the surface of said plate and to cover the surface of said narrow semi-circular grooves, and a protuberant border of insulation material covering the edges of said metallic layers to prevent corona effects on said element.

WERNER BUSCHBECK.
WILHELM KUMMERER.